US005820280A

United States Patent [19]

Fox

[11] Patent Number: 5,820,280

[45] Date of Patent: Oct. 13, 1998

[54] PRINTER WITH VARIABLE TORQUE DISTRIBUTION

[75] Inventor: Duane M. Fox, Snohomish, Wash.

[73] Assignee: Intermec Corporation, Everett, Wash.

[21] Appl. No.: 919,631

[22] Filed: Aug. 28, 1997

[51] Int. Cl.[6] .............................. B41J 11/00; F16D 21/02; F16H 37/06

[52] U.S. Cl. ............... 400/611; 74/665 GA; 74/665 GE; 192/48.9; 192/94; 400/223; 400/225; 400/235

[58] Field of Search ................................ 192/48.9, 84.6, 192/94, 54.51; 74/665 GA, 665 GE; 400/611, 223, 225, 235

[56] References Cited

U.S. PATENT DOCUMENTS

| | | | |
|---|---|---|---|
| 4,376,585 | 3/1983 | Fromme et al. | 400/185 |
| 4,625,218 | 11/1986 | Watanabe | 400/273 |
| 4,788,558 | 11/1988 | Caldwell et al. | 346/76 |
| 5,158,376 | 10/1992 | Alessandro et al. | 400/70 |
| 5,284,396 | 2/1994 | Masumura et al. | 400/234 |
| 5,300,953 | 4/1994 | Schulte | 346/76 PH |
| 5,333,807 | 8/1994 | Maehara et al. | 242/334.6 |
| 5,342,131 | 8/1994 | Nakajima et al. | 400/120.01 |
| 5,441,210 | 8/1995 | Hinton | 242/421.1 |

*Primary Examiner*—Edgar S. Burr
*Assistant Examiner*—Daniel J. Colilla
*Attorney, Agent, or Firm*—Seed and Berry LLP

[57] ABSTRACT

A printer includes a variable torque assembly that allows a printer controller to vary torque on supply and take-up reels in response to monitored diameter of the supply or take-up reels. In one embodiment, the variable torque assembly is a torque divider that divides a fixed amount of torque between a supply reel and a take-up reel. The ratio of torques on the supply and take-up reels is controller by a control stepper motor that adjusts respective Acme gears to adjust pressure on respective clutch plates to increase or decrease the amount of "drag" applied by the clutch plates. In another embodiment, separate control stepper motors control torque to each of the supply and take-up reels so that the overall amount of torque can be varied to accommodate changes in print media lengths.

33 Claims, 4 Drawing Sheets

PRINTER WITH VARIABLE TORQUE DISTRIBUTION

TECHNICAL FIELD

The present invention relates to printers, and more particularly, to control of web tension in printers.

BACKGROUND OF THE INVENTION

As shown diagrammatically in FIG. 1, a conventional thermal printer 40 includes a ribbon supply reel 42 and a print medium supply reel 44 that supply a thermal ribbon 46 and print medium 48, respectively, to a printing assembly 50. The print medium 48 may be paper, labels, or any other known medium for printing images or text. Upon entering the printing assembly 50, the ribbon 56 and print medium 48 pass colinearly through a printing zone 53 between a platen roller 52 and a thermal printhead 54.

As the ribbon 46 and print medium 48 pass the thermal printhead 54, a printer controller 60 activates selected print elements on the printhead 54 to pass current through the selected print elements. The current induces resistive heating in the selected print elements, thereby heating a local region of the ribbon 46 and print medium 48. As the ribbon 46 is heated, thermally sensitive ink on the ribbon 46 transfers to the print medium 48, producing a dark spot or "pixel." The darkness of the pixel corresponds to the amount of current passing through the print element and the time during which the region is adjacent to the print element. Assuming the region is in the printing zone 53 for a constant period, the controller 60 can control the darkness of each pixel by controlling the current to the print elements, thereby constructing an image from the pixels.

Upon leaving the printing zone 53, the ribbon 46 and print medium 48 pass over respective peel bars 47, 49 and exit the printing assembly 50 to a ribbon take-up reel 56 and a print medium take-up reel 58. The take-up reels 56, 58 rotate to maintain tension in the ribbon 46 and print medium 48 and to accumulate the ribbon 46 and print medium 48.

To accurately control the darkness of the pixels, it is desirable that the ribbon 46 and print medium 48 travel past the printhead 54 at a constant speed. If the speed of the ribbon 46 and print medium 48 are not constant, the image may be locally stretched or compressed, causing image distortion. Such distortion can be particularly problematic where the thermal printer prints machine-readable symbols, such as bar code symbols or two-dimensional symbols. Size distortion in such symbols can induce reading errors.

Additionally, tensions of the ribbon 46 and print medium 48 should be carefully controlled as the ribbon 46 and print medium 48 travel past the peel bars 47, 49. If the tensions of the ribbon 46 and print medium 48 differ from a desired tension, several effects may detrimentally affect image quality. For example, at high tensions, the ribbon 46 or print medium 48 may tear as it passes the peel bars 47, 49, thereby interrupting printing. If the tension in the ribbon 46 and print medium 48 is insufficient, the ribbon 46 and print medium 48 may not separate as quickly as desired as they pass the peel bars 47, 49. Consequently, the relative temperatures of the ribbon 46 and print medium 48 may not be at the desired levels as the ribbon 46 and print medium 48 are separated. The incorrect temperatures cause some of the thermal ink to "stick" to the ribbon 46 rather than adhering properly to the print medium 48, causing a ragged edge to a dark region. Additionally, if the tension is incorrect, deformation of the platen roller 52 will be difficult to predict. Consequently, the size of the printing zone 53 may vary and the amount of heat energy transferred between the printhead 54 and the ribbon 46 may be unexpectedly small or large, producing variations in the darkness of pixels.

In the printer 40, a stepper motor 59 rotates the platen roller 52 to propel the ribbon 46 or print medium 48 past the printhead 54. Because the ribbon 46 and print medium 48 are pressed against the printhead 54 by the platen roller 52, rotation of the platen roller 52 drives the ribbon 46 and print medium 48 past the printhead 54 at a speed determined by the stepper motor 59. To maintain tension between the platen roller 52 and take-up reels 56, 58, the stepper motor 59 also drives the take-up reels 56, 58 through respective belts.

One problem with this approach is that, as the ribbon 46 or print medium 48 accumulates on the respective take-up reel 56, 58, the diameter of the take-up reel 56, 58 effectively increases, as indicated by the broken lines in FIG. 1. Thus, the linear speed of the ribbon 46 or print medium 48 would gradually increase if the rotational speed of the respective take-up reel 56, 58 were constant. On the other hand, the platen roller 52 establishes a constant linear speed for the ribbon 46 and print medium 48. The ribbon 46 or print medium 48 cannot continuously travel with a constant tension at both a constant speed and an increasing speed. Therefore, to match the speed at which the take-up reels 56, 58 propel the ribbon 46 or print medium 48, the take-up reels 56, 58 are allowed to "slip" relative to the rotational torque of the stepper motor 59.

To produce such slippage, each of the reels 56, 58 is coupled to the stepper motor 59 through a respective slip clutch 61. The coupling between the stepper motor 59 and the take-up reels 56 is scaled such that the shaft carrying the take-up reel 56, 58 rotates at a higher speed than the platen roller 52. Thus, in the absence of the slip clutches 61, the take-up reels 56, 58 would propel the ribbon 46 or print medium 48 faster than the platen roller 52, regardless of the diameters of the take-up reels 56, 58. The slip clutches 61 allow the reels 56, 58 to slip relative to the stepper motor 59, thereby allowing the take-up reels 56, 58 to rotate more slowly than their respective shafts to correct any differences in linear velocity. Similar slip clutches 65 linked to the printer's frame 67 provide drag to the supply reels 42, 44 thereby maintaining tension between the supply reels 42, 44 and the platen roller 52.

One problem with the above approach is that the slip clutches 61 provide a substantially constant torque to the take-up reels 56, 58 at the interface between the shafts and the reels 56, 58. However, the diameters of the take-up reels 56, 58 increase as the ribbon 46 or print medium 48 accumulate, increasing the effective moment arms to which the substantially constant torques are applied. Consequently, as the reel diameters increase, the forces applied to the ribbon 46 and print medium 48 decrease.

As shown in FIG. 2, one prior art approach to addressing this problem employs separate DC motors 69, 71, 73 to drive the platen roller 52 and the reels 56, 58. Torque applied by the DC motors 69, 71, 73 is then adjusted as the ribbon 46 or print medium 48 accumulate at the take-up reels 56, 58. To measure the amount of accumulated ribbon 46 or print medium 48, the printer controller 60 monitors rotation of the reels 56, 58 to produce a cumulative count indicating the total amount of ribbon 46 or print medium 48 accumulated on the reel 56, 58. The controller 60 then precisely pulse-width modulates the drive currents to the DC motors 69, 71, 73 in response to the cumulative count, gradually increasing the torques applied to the reels 56, 58 as the diameters of the reels 56, 58 increase. The increasing torques offset the increasing moment arm due to ribbon 46 or print medium 48 accumulation, producing a substantially constant tension in the ribbon 46 or print medium 48.

One significant drawback to the above approach is that the cost of the DC motors 67, 71, 73 is substantially higher than the cost of the stepper motor 59. Consequently, the use of two or three DC motors rather than a single stepper motor may increase the cost of the printer 40 beyond an acceptable level. Additionally, the approach of the printer 40 of FIG. 2 requires the retention of a cumulative count. This can be problematic if the ribbon 46 or print medium 48 breaks or must be replaced in mid-roll.

SUMMARY OF THE INVENTION

An apparatus for driving a web or tape, such as a ribbon or print medium, through a printer employs one or more stepper motors to drive a platen roller and ribbon and supply take-up reels. A variable torque assembly varies torque transferred from the stepper motor to each take-up reel as the diameter of the take-up reel increases. In one embodiment, the variable torque assembly is formed from a variable torque divider that divides torque among a supply reel and the take-up reel based upon a monitored or calculated diameter of the take-up reel. To vary the torque of the variable torque divider, a printer controller monitors rotation of the supply and take-up reels with respective optical encoders and, based upon a determined diameter, activates a control stepper motor. The control stepper motor drives Acme gears to adjust pressure on respective clutch plates, thereby distributing the applied torque between the supply and take-up reels.

In another embodiment, the web tension is monitored directly and fed to the controller. The controller then activates a control stepper motor to adjust the division of torque between the supply and take-up reels, thereby maintaining a substantially constant web tension.

In another embodiment, each of the supply and take-up reels includes a separate variable torque assembly, where each variable torque assembly is driven by a separate control stepper motor. Because the torque supplied to the supply and take-up reels can be varied independently, the overall torque may be varied in addition to varying the ratio of the supply and take-up torques.

DETAILED DESCRIPTION OF THE INVENTION

Figure 1:
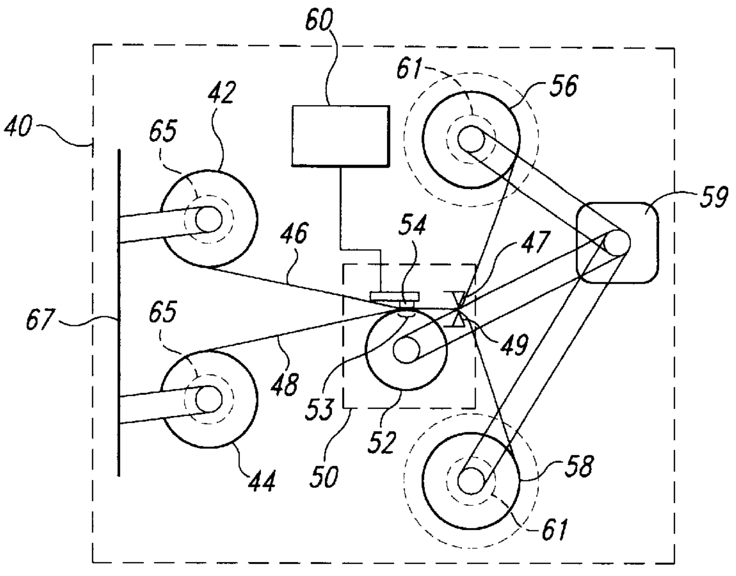
Fig. 1 (Prior Art)
FIG. 1 is a diagrammatic representation of a prior art printer driven by a stepper motor showing paths of print ribbon and print medium past a printhead and platen roller.
Figure 2:
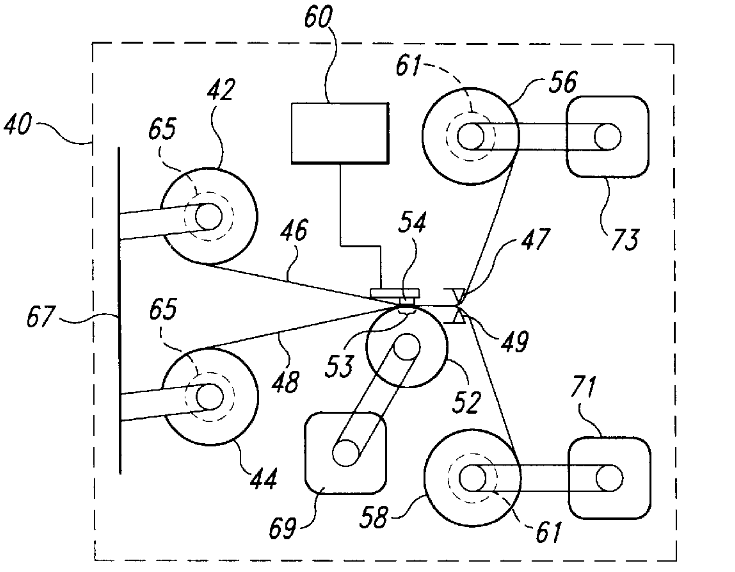
Fig. 2 (Prior Art)
FIG. 2 is a diagrammatic representation of a prior art printer driven by three DC motors.
Figure 3:
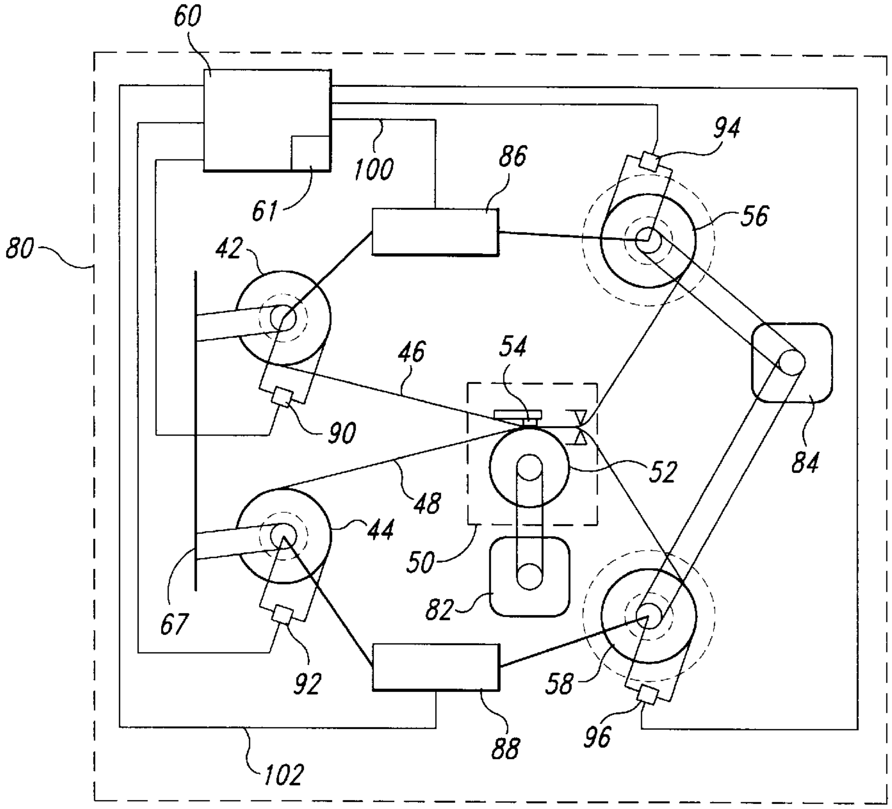
FIG. 3 is a diagrammatic representation of a printer according to one embodiment of the invention including separate torque dividers for the ribbon and print medium.

As shown in FIG. 3, a thermal printer 80 according to the invention includes several components that are analogous to the printer 40 of FIG. 1, where common elements are numbered the same. As with the printer 40, the platen roller 52, under control of the controller 60, propels the ribbon 46 and the print medium 48 past the thermal printhead 54. To turn the platen roller 52, the printer 80 utilizes a simple stepper motor 82 that rotates in fixed angular steps in response to pulses from the controller 60. The ribbon take-up reel 56 and print medium take-up reel 58 are driven by another common stepper motor 84. Although the stepper motors 82, 84 are presented in FIG. 3 as being coupled to the platen roller 52 and reels 56, 58 through belts, one skilled in the art will recognize that the stepper motors 82, 84 can drive the platen roller 52 and reels 56, 58 through a variety of approaches, including direct coupling, gearing, chains, or any other conventional approach.

A pair of torque dividers 86, 88 link the ribbon supply reel 42 to the ribbon take-up reel 56 and the print medium supply reel 44 to the print medium take-up reel 58, respectively. As will be described below, the torque dividers 86, 88 divide a fixed torque among the reel pairs 42, 56 and 44, 58 under control of the controller 60.

To determine the appropriate division of torque among the reel pairs 42, 56 and 44, 58, the controller 60 monitors the diameters of the reels 42, 44, 56, 58 through respective diameter monitors 90, 92, 94, 96. As will be discussed in greater detail below with reference to FIG. 4, the diameter monitors 90, 92, 94, 96 provide to the controller 60 signals indicating the diameters of the respective reels 42, 44, 56, 58, including the accumulated ribbon or print medium. Based upon the determined diameters of the reels 42, 44, 56, 58, the controller 60 provides control signals on respective control lines 100, 102 to set the ratios of the torque dividers 86, 88.

Figure 4:
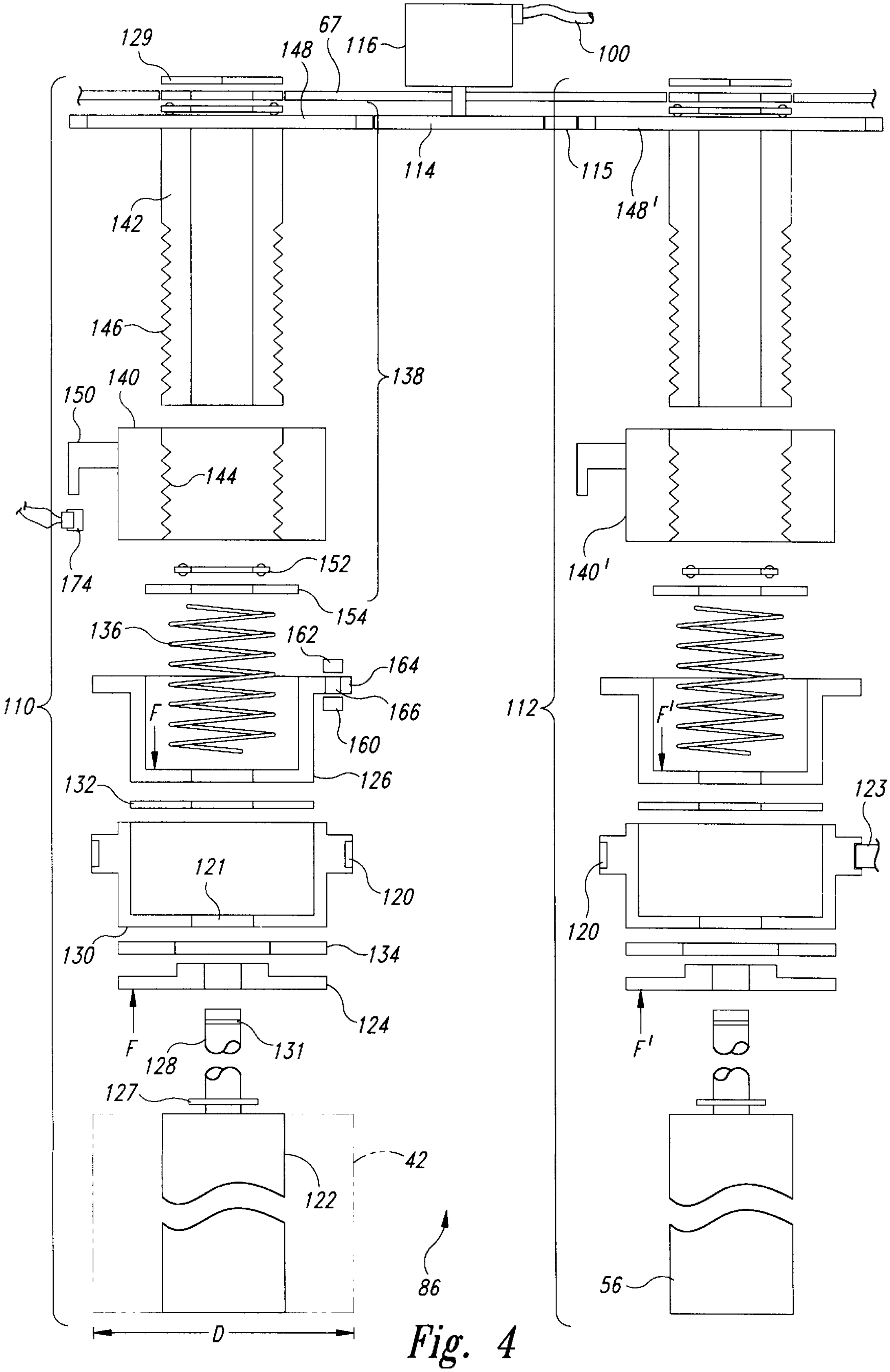
FIG. 4 is an exploded, cross-sectional top plan view of a variable torque divider including variable torque assemblies linked by a control gear and a reversal gear.

Control of torque division by the torque dividers 86, 88 will now be explained with reference to FIG. 4. As shown in FIG. 4, the torque divider 86 is formed from two variable torque assemblies 110, 112 that are linked by a control gear 114 and a reversal gear 115. A control motor 116 drives the control gear 114 to adjust torque division, as will be described below. The control motor 116 is a conventional stepper motor that is controlled through the control line 100 by the controller 60 (FIG. 3).

Figure 5A:
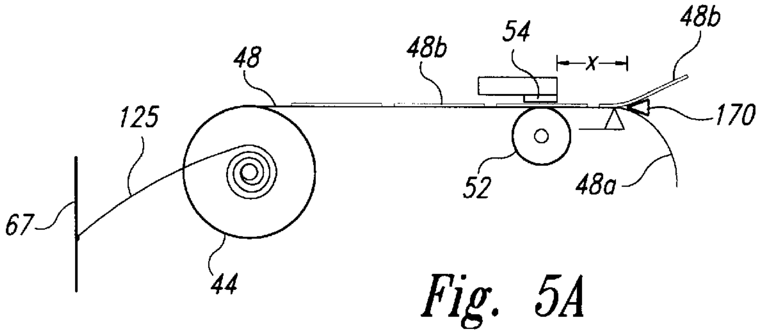
FIG. 5A is a diagrammatic representation of a portion of the printer of FIG. 3 where a torsion spring is compressed during printing.
Figure 5B:
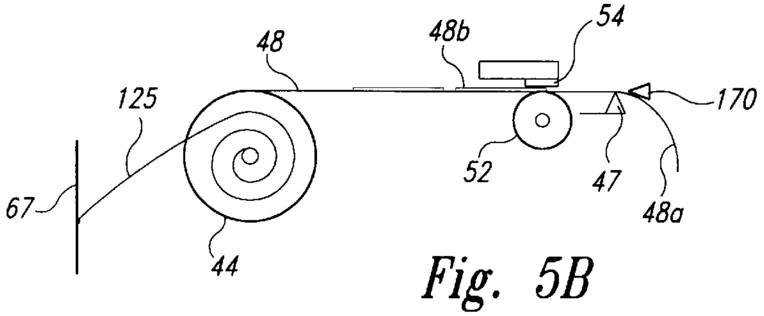
FIG. 5B is a diagrammatic representation of the portion of the printer of FIG. 3 where the torsion spring is relaxed during retraction.

The torque assemblies 110, 112 are substantially identical. Therefore, only the supply variable torque assembly 110 will be described in detail herein. Before describing the structure and operation of the variable torque assembly 110 in detail, it is helpful to describe the general function of the variable torque assembly 110. In general, the variable torque assembly 110 transfers applied torque from a pulley 120 to a reel hub 122 through clutch plates 124, 126 mounted to a common shaft 128 with the reel hub 122. The pulley 120 of the take-up torque assembly 112 receives torque from the stepper motor 84 (FIG. 3) through a belt 123. The pulley 120 of the supply torque assembly 110 is linked to the printer frame 67 through a torsion spring 125 as shown in FIGS. 5A and 5B so that the torsion spring 125 applies torque to resist rotation induced by the ribbon 46 or print medium 48, as will be described in greater detail below.

The structure and operation of the variable torque assembly 110 will now be described. The shaft 128 is a metal shaft having a D-shaped cross section. The shaft 128 supports and aligns the components of the variable torque assembly 110 and is held to the frame 67 by a lock ring 129 that engages a machined groove 131 at a first end of the shaft 128.

The clutch plates 124, 126 encircle the D-shaped shaft 128 and conform to the shaft 128 such that the clutch plates 124, 126 are free to travel axially along the shaft but are not free to rotate about the shaft 128. A stop ring 127 limits travel of the inner pressure plate 124 toward the reel 42. The pulley 120 includes a circular passageway 121 that encircles the D-shaped shaft 128. Because the passageway 121 is not D-shaped, the pulley 120 is free to rotate about the shaft 128. Thus, rotational torque applied to the pulley 120 is transferred to the shaft 128 only through the clutch plates 124, 126.

The amount of torque transferred between the pulley 120 and the shaft 128 is determined by a force F that presses the clutch plates 124, 126 against a pressure plate 130 integral to the pulley 120. To prevent wear of the clutch plates 124, 126 and pressure plate 130 and to provide an effective sliding surface between the clutch plates 124, 126 and the pressure plate 130, a pair of stainless steel washers 132, 134 are positioned on opposite sides of the pressure plate 130.

The magnitude of the force F is determined by compression of a biasing member or spring 136 controlled by an adjuster 138. The adjuster 138 is formed from a collar 140 mounted to an adjuster sleeve 142 by matching Acme threads 144, 146 such that, as the sleeve 142 rotates relative to the collar 140, the collar 140 travels axially along the sleeve 142. The sleeve 142 in turn is mounted to a drive gear 148 whereby the gear 148 and sleeve 142 are maintained in a fixed location on the frame 67, but allowed to rotate about the axis of the sleeve 142. That is, the gear 148 and sleeve 142 can rotate about the shaft 128.

The collar 140 is free to move axially along the sleeve 142 (and the shaft 128) and is prevented from rotating by an ear 150 that engages a slot in the frame 67 (not shown). Thus, as the gear 148 turns the sleeve 142, the collar 140 moves axially along the sleeve 142 in a direction determined by the rotational direction of the gear 148, while the ear 150 slides within the slot.

As the collar 140 moves axially, the collar 140 presses upon a thrust washer 152 and a flat washer 154 that contact the spring 136, thereby applying an axial force to the spring 136. As discussed above, the spring 136 engages an exterior face of the pressure plate 126, however, the stop ring 127 prevents the pressure plate 124, and thus the clutch plate 130 and pressure plate 126, from sliding axially. Therefore, the end of the spring 136 that engages the pressure plate 126 does not move axially and, as the collar 140 moves axially, the spring 136 is compressed. Because the force exerted by the spring 136 is proportional to the distance over which the spring 136 is compressed, the force F applied to the pressure plates 124, 126 is proportional to the axial position of the collar 140 on the sleeve 142.

The control motor 116, under the control of the controller 60, controls the force F by rotating the control gear 114 to adjust the position of the collar 140 on the sleeve 142. The controller 60 is therefore able to control the force F on the pressure plates 124, 126 by controlling the rotational position of the control motor 116.

To determine the appropriate magnitude of the force F, the controller 60 determines the diameter D of the reel 44, including the ribbon 46 or print medium 48 wound thereupon. To determine the diameter D, the controller 60 monitors rotation of the shaft 128 by monitoring rotation of the pressure plate 126 with an optical encoder formed from an emitter 160 and detector 162 that align to a flange 164 integral to the pressure plate 126. The flange 164 includes several transparent holes or slits 166 circumferentially spaced along the flange 164. As the pressure plate 126 rotates, the slits 166 pass between the emitter 160 and detector 162 to alternately block or pass light from the emitter 160 to the detector 162. In response to each "pulse" of light, the detector 162 produces electrical pulses that are received by the controller 60 and allow the controller 60 to determine the amount of rotation of the pressure plate 126, and thus the shaft 128. The controller 60 then compares the rotation of the shaft 128 to the known rotation of the platen roller 52. Because a length of ribbon 46 or print medium 48 extends between the platen roller 52 and the reels 42, 44, the linear distance traveled by each of the platen roller 52 and reels 42, 44 will be identical. Thus, the relative diameters of the platen roller 52 and the supply reels 42, 44 can be determined easily from the ratio of the angles of rotation or ratios of angular velocity of the supply reels 42, 44 and the platen roller 52. Since the platen roller 52 has a fixed diameter, the diameter D of the supply reels 42, 44 can be determined from the ratio.

In the preferred embodiment, the various calculations are preprogrammed into a lookup table in a memory 61 (FIG. 3) to simplify the tasks performed by the controller 60 and to increase the speed of the printer 80, however, the controller 60 could dynamically calculate the diameter D. The controller 60 thus simply monitors pulses from the detector 162 and compares the pulse rate from the detector 162 to the pulse rate of the stepper motor 82 to produce a ratio. Based upon the ratio, the controller 60 accesses the lookup table in the memory 61 to retrieve a stored collar position. The controller 60 responds to the retrieved collar position by supplying pulses to the control motor 116 to rotate the gear 148, thereby moving the collar 140 axially. The controller 60 determines the final collar position by accumulating the number of pulses and computing, based upon the Acme thread dimensions, a cumulative distance of travel of the collar 140.

Turning now to the variable torque assembly 112, the gear 148' on the take-up torque assembly 112 is linked to the control gear 114 through the reversal gear 115. Rotation of the control gear 114 produces equal and opposite rotations of the gears 148, 148' so that, as the control gear 114 rotates, the collars 140, 140' move in opposite directions. Changes in the force F on the supply side pressure plate 130 are therefore accompanied by inverse changes in the force F' on the take-up side pressure plate 130 such that, as torque on the supply reels 42, 44 is increased, torque on the take-up reel 56 is increased. The torque divider 86 thus distributes a substantially fixed amount of torque among the reels 42, 56.

Another feature of the printer 40 that is visible in FIG. 4 is an optical detector 174 that aligns to the ear 150 to help establish the initial torque provided by the variable torque assembly 112. The optical detector 174 is formed from an optical emitter and detector pair positioned such that the light beam between the emitter and detector intersects the path of travel of the ear 150 at approximately the midpoint of travel. When the printer 80 is initialized, as may occur, for example, upon power-up or after changing paper rolls, the controller 60 activates the optical detector 174 to determine whether or not the ear 150 extends between the emitter and detector. If the ear 150 blocks light from reaching the detector, the controller 60 determines that the collar 140 is past the desired starting position, at approximately the midpoint of travel of the ear 150. In response, the controller 60 activates the control motor 116 to rotate the gears 114, 115, 148, thereby rotating the sleeve 142 and moving the collar 140 toward the gear 148 until the optical detector 174 indicates that the collar 140 is at the midpoint. As the collar 140 moves toward the gear 148, tension on the spring 136 falls to a desired starting tension.

If the ear 150 does not block light from reaching the detector, the controller 60 activates the control motor 116 to rotate the sleeve 142 such that the collar 150 moves away from the gear 148, until the detector 174 indicates that the ear 150 has reached the midpoint. The traveling collar 140 thus compresses the spring 136 to the desired starting tension. In either case, when a voltage output from the detector 174 transitions from low to high or high to low, the controller 60 determines that the ear 150 has just exited the detector 174 or just entered the detector 174. In either case, the collar 140 is approximately in the desired starting position. Because the printer 80 detects the collar position and establishes the initial position in response, the printer 80 is able to adapt to changes in reel diameter that may occur when the ribbon 46 or print medium 48 are changed.

As will now be described, the printer 80 automatically retracts the print medium 48 to establish an initial printing position during single label "demand" printing. Referring now to FIGS. 5A and 5B, as shown in FIG. 5A, the print medium 48 includes a backing **48*a* and labels 48*b* that are attached to the backing 48*a* with an adhesive. After the print medium 48 travels past the printhead 54 and over the peel bar 47, a stripping bar 170 separates the label 48*b* from the backing 48*a*. To allow the strip bar 170 to strip the entire label 48*b* from the backing 48*a*, the entire label 48*b* moves to a position where its trailing edge reaches the edge of the strip bar 170. In this position, the trailing label 48 has traveled a distance X past the printhead 54**.

If the labels are being printed continuously, the printhead 54 will be able to print on the trailing label **48*b* while the leading label 48*b* is being stripped by the strip bar 170. However, in demand mode, only one label is printed at a time. The trailing label 48*b* is therefore not printed while the leading label 48*b* is being stripped from the backing 48*a*. Consequently, a small unprinted portion of the trailing label 48*b* extends past the printhead 54**.

To allow printing on the entire trailing label **48*b*, the platen roller 52 reverses after printing to return the trailing label 48*b* to the position shown in FIG. 5B. To maintain tension in the print medium 48, a torsion spring 125 coupled to the frame 67 reverses rotation of the print medium supply reel 44. One skilled in the art will recognize that a similar torsion spring arrangement drives the ribbon supply reel 42 so that the ribbon 46 will travel in tandem with the print medium 48**.

Figure 6:
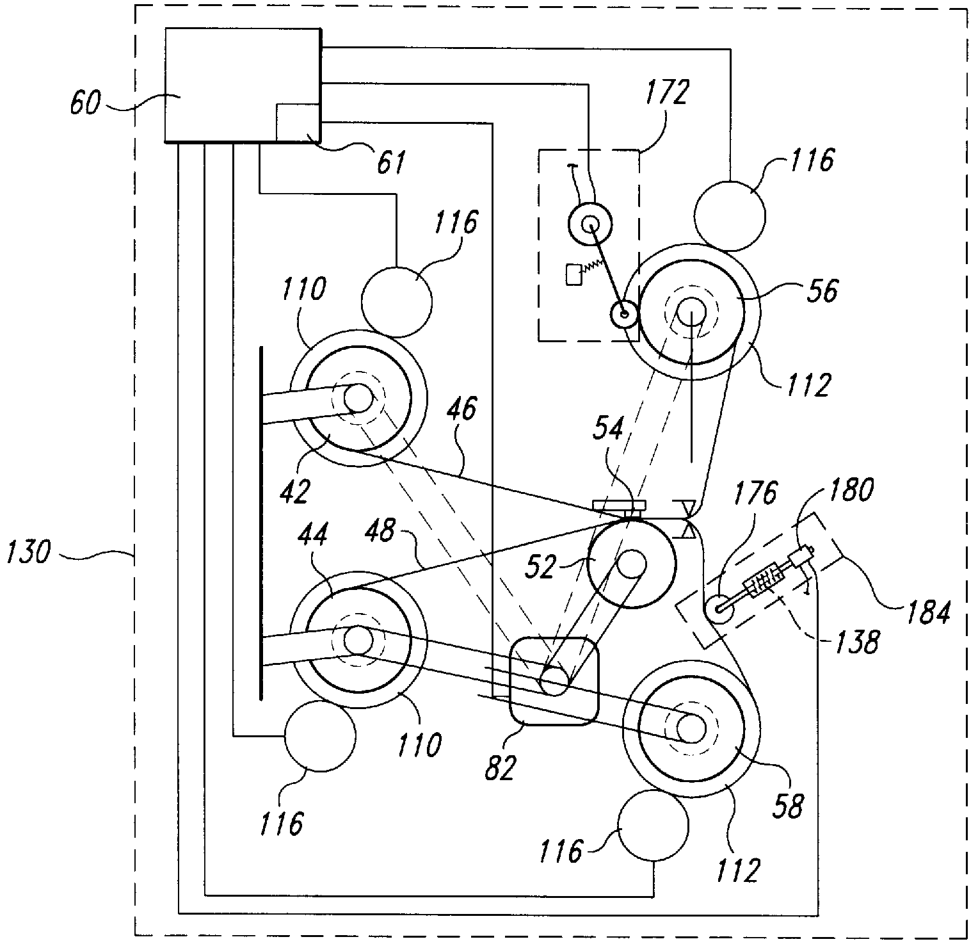
FIG. 6 is a diagrammatic representation of an alternative embodiment of the printer that includes separate control motors for each of the variable torque assemblies.

FIG. 6 shows another embodiment of the printer 80 in which separate control motors 116 control the variable torque assemblies 110, 112, and in which a single stepper motor 82 drives the platen roller 52 and all of the reels 42, 44, 56, and 58. As will be clear to one skilled in the art, the use of a single stepper motor 82 to drive all of the reels 42, 44, 56, 58 and the platen roller 52 reduces the overall costs of the printer 130. The use of separate stepper motors for each of the variable torque assemblies 110, 112 can increase the cost of the printer 130; however, the separate motors 116 allow the controller 60 to adjust the torque on each of the reels 42, 44, 56, 58 independently. The controller 60 can therefore vary the total amount of torque on the pairs of reels 42, 56 and 44, 58. This allows the printer 130 to vary the web tension to accommodate different types of ribbons 46 or print media 48. Additionally, the variable total torque allows printer 130 to establish equal web tension for different reel sizes. For example, upon switching from a reel carrying 6,000 inches of print medium or ribbon to an 18,000-inch reel, the controller 60 can increase total torque to be divided among the pairs of reels 42, 56 and 44, 58, thereby offsetting the increased moment arm of an 18,000-inch reel, as compared to a 6,000-inch reel. Further, the use of separate motors 116 allows the sleeves 142 to be driven without gears by mounting the sleeves 142 directly to the motors 116.

In another departure from the printer 80, the diameter of the reels 42, 44, 56, 58 in the printer 130 is monitored directly with a diameter monitor 172, as shown for the ribbon take-up reel 156 in FIG. 6. A variety of diameter monitors are known, and include optical sensors and sense arms coupled to variable resistors. Further, the ribbon or print medium tension is monitored directly by a web tension monitor 184, as shown for the print medium 48 in FIG. 6. The web tension monitor includes a spring-mounted pulley 176 that engages a section of the print medium 48 or ribbon 46. A position sensor monitors the position of the pulley 176 and provides a signal to the controller 60 indicating the position of the pulley 176. The compression of a spring 178, and thus the position of the pulley 176, will be determined by the tension in the print medium 48 or ribbon 46. Thus, the tension monitor 184 provides a signal to the controller 60 indicative of web tension. In response to the signals from the diameter monitor 172 and the web tension monitor 184, the controller 60 accesses the lookup table 61 and adjusts torque division in the pairs of reels 42, 56 and 44, 58 as described above.

While the invention has been presented herein by way of exemplary embodiments, various modifications may be made without departing from the spirit and scope of the invention. For example, the single stepper motor configuration of the printer 130 may be combined with the torque divider 86, 88 of the printer 80. Similarly, other motors, such as DC motors, can be used in place of the stepper motors 82, 84, although such an embodiment would not be preferred because of the increased cost of DC motors as compared to stepper motors. Additionally, where the print medium 48 is thermally active (i.e., does not require a separate ribbon for printing), the ribbon supply reel 42, ribbon take-up reel 156 and torque divider 86 can be eliminated from the printer 80 to further reduce costs. Accordingly, the invention is not limited except as by the appended claims.

I claim:

1. A torque divider for a web or tape in a printer, comprising:

a supply reel;

a take-up reel;

a first clutch assembly coupled to the supply reel and having a first torque input, the first clutch assembly including an adjustable first bias member, the first clutch assembly being configured to transfer to the supply reel a portion of a first torque applied to the first torque input in response to a first bias force applied to the first bias member;

a second clutch assembly coupled to the take-up reel and having a second torque input, the second clutch assembly including an adjustable second bias member, the second clutch assembly being configured to transfer to the take-up reel a portion of a second torque applied to the second torque input in response to a second bias force applied to the second bias member; and a control motor coupled to the first and second bias members and responsive to a control signal to apply the first and second biasing forces to the first and second bias members, respectively.

2. The torque divider of claim 1 wherein the first and second bias members are respective springs.

3. The torque divider of claim 1, further comprising:

a first threaded shaft coupled to the control motor; and a first collar, mateably threaded onto the shaft and engaging the first bias member.

4. The torque divider of claim 3, further comprising:

a second threaded shaft coupled to the control motor; and a second collar, mateably threaded onto the shaft and engaging the second bias member.

5. The torque divider of claim 1, further comprising a diameter sensor configured to detect a diameter of the take-up reel or supply reel and wherein the control motor is operative to inversely vary the first and second biasing forces in response to the detected diameter.

6. The torque divider of claim 1, further including an initial force detector positioned to detect an initial force on the first or second biasing members.

7. A printer, comprising:

a first motor for providing a driving torque;

a supply reel rotatable about a first axis for carrying a supply of print medium;

a take-up reel rotatable about a second axis for taking up print medium;

a variable torque divider having a torque input coupled to the driver motor, a control input, a first torque output coupled to the first reel, and a second torque output coupled to the second reel, the torque divider being operative to transfer a first portion of the driving torque to the first reel and to transfer a second portion of the driving torque to the second reel, wherein the relative magnitudes of the first and second portions are determined by a control signal at the control input.

8. The printer of claim 7, further including a diameter detector positioned to determine a diameter of a supply of print medium on the supply reel or roll of print medium on the take-up reel, the diameter detector having a detector output coupled to the control input to provide the control signal.

9. The printer of claim 8 wherein the torque divider includes a first variable clutch assembly having a first pressure surface coupled to the first reel, a first mating surface positioned to engage the first pressure surface and a pressure source configured to force the first pressure surface and first mating surface into engagement, the first pressure source having a variable force output and a force select input coupled to the control input, wherein the force between the first pressure surface and the first mating surface is responsive to the control signal.

10. The printer of claim 9 wherein the torque divider includes a second variable clutch assembly having a second pressure surface coupled to the second reel, a second mating surface positioned to engage the second pressure surface and a pressure source configured to force the second pressure surface and second mating surface into engagement, the second pressure source having a variable force output and a force select input coupled to the control input, wherein the force between the second pressure surface and the second mating surface is responsive to the control signal.

11. The printer of claim 9 wherein the first pressure source includes:

a first collar gear resiliently coupled to the first pressure surface and configured to apply the variable force to the first pressure surface in response to a rotational force applied to the first collar gear; and a driving motor coupled to the drive gear to apply the rotational force.

12. The printer of claim 9, further including an initial force detector coupled to the first pressure surface.

13. The printer of claim 12 wherein the first pressure source includes an initial input coupled to the diameter detector, wherein the first pressure source is responsive to apply a selected initial force to the first pressure plate in response to the detected diameter.

14. The printer of claim 7, further comprising:

a print medium supply; and a torsion spring coupled between the supply reel and print medium supply, the torsion spring being configured to permit an initial travel of the print medium supply without rotating the supply reel.

15. The printer of claim 7, further comprising:

a memory containing a look-up table of conversion data; and an electronic printer coupled between the diameter detector and the variable torque divider, the controller further being coupled to the memory and configured to access conversion data in response to the control signal and to adjust the torque divider in response thereto.

16. A print medium driver apparatus, comprising:

a driving torque input;

a torque divider coupled to the driving torque input, the torque divider having a first output and a second output and operative to distribute the driving torque between the first and second outputs in response to a torque control input;

a supply reel coupled to the first output;

a take-up reel coupled to the second output; and a demand sensor coupled to the supply reel or the take-up reel, the demand sensor producing the torque control input in response to a sensed demand of the supply reel or the take-up reel.

17. The print medium driver of claim 16 wherein the torque divider includes:

a first clutch assembly coupled between the driver motor and the first output, the first clutch assembly having a pressure input coupled to receive the output pressure from the demand sensor, the first clutch assembly further being responsive to apply a first rotational force to the first output corresponding to the magnitude of the output pressure; and a second clutch assembly coupled between the driver motor and the second output, the second clutch assembly having a pressure input coupled to receive the output pressure from the demand sensor, the second clutch assembly further being responsive to apply a second rotational force to the second output corresponding to the magnitude of the output pressure.

18. The print medium driver of claim 16, further comprising a torsion spring coupled to the first or second output and operative to establish a threshold torque to the first or second output.

19. The print medium driver of claim 16 wherein the demand sensor includes an acme thread assembly linked to the first or second output.

20. The print medium driver of claim 16, further comprising:

an initial position detector operative to detect rotation of the supply reel and to produce an initial position signal in response thereto; and an electronic controller having an input coupled to the initial position detector and an output coupled to the driver motor, the electronic controller being responsive to the initial position signal to provide an output signal to the driver motor indicative of a starting location for the print medium.

21. The print medium driver of claim 20 wherein the first or second clutch assembly includes a clutch plate and wherein the initial position detector includes an optical detector operative to monitor rotation of the clutch plate.

22. A method of driving a print medium through a printer having a supply reel and a take-up reel for supplying and taking up the print medium respectively, comprising the steps of:

generating a driving torque;

applying the driving torque to the take-up reel to cause the take-up reel to rotate;

in response to rotation of the take-up reel, dividing the driving torque into a supply torque and a take-up torque;

applying the supply torque to the supply reel; and applying the take-up torque to the take-up reel.

23. The method of claim 22 wherein the step of dividing the driving torque into a supply torque and a take-up torque includes the steps of:

producing a first pressure and a second pressure in response to the rotation of the take-up reel;

applying the first pressure to a first clutch plate;

applying the second pressure to a second clutch plate; and applying the driving torque to the first and second clutch plates.

24. The method of claim 23 wherein the step of applying the supply torque to the supply reel includes the step of engaging the first clutch plate to a first pressure plate linked to the supply reel; and applying the take-up torque to the take-up reel includes the step of engaging the second clutch plate to a second pressure plate linked to the take-up reel.

25. The method of claim 22 wherein the step of applying the driving torque to the take-up reel to cause the take-up reel to rotate includes the steps of:

detecting an initial position of the print medium;

identifying a desired initial position of the print medium; and rotating the take-up reel until the print medium moves from the initial position to the desired initial position.

26. A method of printing on a thermal print medium, the method comprising the steps of:

turning a first shaft with a first torque;

establishing a desired tension of the thermal print medium;

determining an initial reel diameter of a reel carrying a portion of the print diameter;

in response to the established desired tension and the determined initial reel diameter, transferring a portion of the torque from the first shaft to the first reel;

monitoring changes in the reel diameter; and in response to the monitored changes in the reel diameter, adjusting the portion of torque transferred from the first shaft to the first reel.

27. The method of claim 26, further comprising the step of establishing an initial torque on the reel, before the step of transferring a portion of the torque from the first shaft in response to the established tension and determined reel diameter.

28. The method of claim 26 wherein the step of transferring a portion of the torque includes applying a force to a clutch assembly linked to the first reel.

29. The method of claim 28 wherein the step of applying a force to a clutch assembly includes the step of compressing a spring coupled to the clutch assembly.

30. The method of claim 28 wherein the step of applying a force to a clutch assembly includes the step of activating a control motor to apply a resilient force to the clutch assembly.

31. A method of producing tension in a print medium or a ribbon in a printer, comprising the steps of:

mounting the print medium or ribbon to a supply reel and a take-up reel;

producing a driving torque;

applying the torque to a shaft;

coupling a first portion of the applied torque from the shaft to the take-up reel;

coupling a dragging torque to the supply reel;

determining a diameter of the supply or take-up reel; and in response to the determined diameter, inversely varying the magnitudes of the first portion of the torque and the dragging torque.

32. The method of claim 31 wherein the step of coupling a first portion of the applied torque to the take-up reel includes supplying a first force to a first clutch assembly linking the shaft to the take-up reel, the step of coupling the dragging torque to the supply reel includes applying a second force to a second clutch assembly coupled to the supply reel, and the step of inversely varying the torque includes the step of inversely varying the first and second forces.

33. The method of claim 31 wherein the step of determining a diameter of the supply or take-up reel includes the steps of:

monitoring a speed of travel of the print medium or ribbon;

monitoring a speed of rotation of the supply or take-up reel; and from the monitored speed of travel and speed of rotation, determining the diameter of the supply or take-up reel.

* * * * *